US008739020B2

(12) United States Patent
Khosla et al.

(10) Patent No.: US 8,739,020 B2
(45) Date of Patent: May 27, 2014

(54) ENHANCED FAVORITES SERVICE FOR WEB BROWSERS AND WEB APPLICATIONS

(75) Inventors: Aditya Khosla, Sunnyvale, CA (US); Brock Laporte, San Carlos, CA (US); Alberto Cobas, Scotts Valley, CA (US); Colin Chang, San Jose, CA (US); Joseph Van Valen, Sunnyvale, CA (US)

(73) Assignee: Aol Inc., Dulles, VA (US)

( * ) Notice: Subject to any disclaimer, the term of this patent is extended or adjusted under 35 U.S.C. 154(b) by 1210 days.

(21) Appl. No.: 11/197,681

(22) Filed: Aug. 3, 2005

(65) Prior Publication Data
US 2007/0033516 A1 Feb. 8, 2007

(51) Int. Cl.
*G06F 17/00* (2006.01)
*G06F 3/00* (2006.01)

(52) U.S. Cl.
USPC .......................................... 715/206; 715/738

(58) Field of Classification Search
USPC .............................. 715/501, 500, 738; 707/10
See application file for complete search history.

(56) References Cited

U.S. PATENT DOCUMENTS

| | | | |
|---|---|---|---|
| 6,782,430 B1 | 8/2004 | Cragun | |
| 6,784,900 B1 | 8/2004 | Dobronsky et al. | |
| 6,959,339 B1 | 10/2005 | Wu et al. | |
| 7,080,139 B1 * | 7/2006 | Briggs et al. | 709/224 |
| 2003/0184583 A1 | 10/2003 | Lim | |
| 2003/0212904 A1 | 11/2003 | Randle et al. | |
| 2004/0001081 A1 | 1/2004 | Marsh | |
| 2004/0003118 A1 | 1/2004 | Brown et al. | |
| 2004/0189695 A1 | 9/2004 | Kurtz et al. | |
| 2004/0267779 A1 * | 12/2004 | Carter et al. | 707/100 |
| 2005/0165615 A1 * | 7/2005 | Minar | 705/1 |
| 2005/0188403 A1 | 8/2005 | Kotzin | |
| 2005/0203917 A1 * | 9/2005 | Freeberg et al. | 707/10 |
| 2005/0216825 A1 * | 9/2005 | Teague | 715/501.1 |
| 2005/0289468 A1 * | 12/2005 | Kahn et al. | 715/738 |
| 2006/0073812 A1 | 4/2006 | Punaganti et al. | |
| 2006/0265396 A1 * | 11/2006 | Raman et al. | 707/10 |
| 2007/0050734 A1 * | 3/2007 | Busey | 715/853 |

FOREIGN PATENT DOCUMENTS

GB 2352600 1/2001

OTHER PUBLICATIONS

"AvantGo Version 5/7+ Pocket PC User Guide" copyright 1998-2004; Downloaded on Dec. 15, 2005; 64 pages.
"mobilerss.net"; retrieved from website: http://www.milerss.net; retrieved on Oct. 25, 2005; 2 pages.
"mobilerss.net, about"; retrieved from website http://www.mbilerss.net/about.php; retrieved on Dec. 15, 2005; 1 page.

(Continued)

*Primary Examiner* — Boris Pesin
*Assistant Examiner* — Matthew Ell
(74) *Attorney, Agent, or Firm* — Finnegan, Henderson, Farabow, Garrett & Dunner L.L.P.

(57) ABSTRACT

The invention provides two enhancements for the use of favorites during a Web browsing session. A first enhancement identifies when a user is adding a favorite to his favorites list and auto-suggests a category under which the favorite could be stored. A second enhancement allows a user to review his favorites list and see a summary of feed content (RSS or other standard) on each feed enabled page on his favorites list, without requiring the user to link to the page in question.

7 Claims, 7 Drawing Sheets

(56) References Cited

OTHER PUBLICATIONS

"TwoPeaks Releases Free MobileRSS Beta"; retrieved on Oct. 25, 2005 from website: http://www.pocketpcthoughts.com/forums/viewtopic.phop?p=156370; 5 pages.

"Introduction to RSS"; created on Mar. 27, 2000; Revised on Apr. 14, 2003; Downloaded on Oct. 25, 2005 from website http://www.webreference.com/authoring/languages/xml/rss/intro; 3 pages.

"RSS Syndication and Aggregation"; created on Mar. 27, 2000, revised on May 7, 2001; copyright 2005, Downloaded on Oct. 25, 2005 from website http://www.webreference.com/authoring/languages/xml/rss/intro/2.html; 3 pages.

"WebRef and the Future of RSS"; created on Mar. 27, 2000, revised on Mar. 27, 2000, copyright 2005, downloaded on Oct. 15, 2005; 3 pages.

"RSS"; copyright 2005, downloaded on Oct. 26, 2005 from website: http://www.webopedia.com/TERM/R/RSS.html; 3 pages.

"RDF"; copyright 2005; downloaded on Oct. 26, 2005 from website: http://www.webopedia.com/TER/R/RSS.html; 2 pages.

"What is RSS?"; copyright 1998-2005, downloaded on Oct. 26, 2005 from website: http://www.xml.com/lpt/a/2002/12/18/dive-into-xml.html; 8 pages.

java.net, "Rome v0.4 Tutorial Using Rome to Convert a syndication feed from one type to another" URL:java.net/bin/view/Javawsxml/Rome04TutorialFeedConverter; Oct. 13, 2005 (via Wayback Machine: archive.org/web/20051013055524/wiki.java.net/bin/view/Javawsxml/Rome04TutorialFeedConverter).

java.net, The Source for Java Technology Collaboration, rome, https://rome.dev.java.net.

Home page for Syndic8.com, copyright 2001-2004; retrieved online from website: http://web.archive.org/web/20041112060816/httP;;//www.sndic8.com/.

A better PDAnews aggregator by Marc; Jan. 3, 2004; retrieved online from website: Http://blogs.officezealot.com/marc/archive/2004/01/03/2156.aspx.

Internet Archive, Frequently Asked Questions; Mar. 10, 2001; retrieved online from website: http://www.archive.org/about/faqs.php; Dec. 6, 2006; 46 pages.

"Using AdvantGo Mobile Inspection 2.0", copyright 2002; Downloaded on Dec. 15, 2005; 16 pages.

"AdvantGo user Guides"; copyright 1998-2005; Downloaded on Dec. 15, 2005; 1 page.

"Database Reference Guide for AvantGo Mobile Inspection 2.0"; copyright 2002; Downloaded on Dec. 15, 2005; 42 pages.

"Inspector Training Setup Guide"; copyright 2002; Downloaded on Dec. 15, 2005; 46 pages.

"Installation and Setup Guide for AvantGo Mobile Inspection Version 2.0"; copyright 2002; Downloaded on Dec. 15, 2005; 46 pages.

"AvantGo version 3.x Palm User Guide"; Downloaded Dec. 15, 2005; 91 pages.

"AvantGo version 3.x Pocket PC User Guide"; Downloaded Dec. 15, 2005; 79 pages.

"AvantGo Version 5.7+ Palm User Guide"; copyright 1998-2004; Downloaded on Dec. 15, 2005; 60 pages.

\* cited by examiner

ENHANCED FAVORITES SERVICE FOR WEB BROWSERS AND WEB APPLICATIONS

BACKGROUND OF THE INVENTION

1. Technical Field

The invention relates to management and viewing of "favorites" or "bookmarks". More particularly, the invention relates to an enhanced favorites service built in to a Web browser as well as available from a web site, accessible from any web browser.

2. Description of the Prior Art

Web browsing has evolved into a sophisticated information management process. Web browsing sessions produce much information that the user may wish to access at a later time. Currently, users save Web pages of interest as "favorites". Each favorite is manually cached by the user in one of several subject matter relevant folders. This process is both inefficient and inexact. The user must make a decision based on imperfect information, i.e. the user may not have fully reviewed the content of the page that is being added to his favorites list, and thus places the page in the wrong category. The later retrieval of such favorite information may be hampered by such wrong categorization.

It would be advantageous to provide an automatic and consistent approach to organizing favorites.

Further, many such favorites have feeds (conforming to RSS or other standards) associated with them. RSS (Really Simple Syndication) is a format for syndicating news and the content of news-like sites, including major news sites such as Wired, news-oriented community sites such as Slashdot, and personal web logs. Once information about each item is in RSS format, an RSS-aware program can check the feed for changes and react to the changes in an appropriate way (see http://www.xml.com/pub/a/2002/12/18/dive-into-xml.html). Currently, Web pages that have associated RSS feeds provide a list of RSS items when the page is linked to. Modern browsers, such as Safari (Apple Corp, Cupertino, Calif.) provide an icon that indicates that such pages contain RSS content. Such browsers also indicate the presence of new RSS content in a favorites list with an indicium, such as an icon or numeric indication. Unfortunately, there is no way for a user to review a favorites list and determine if any of the information on the linked page is of interest, except to follow the link to the page in question and review the information at the page itself. Because much of the RSS information is duplicated over many Websites, a user invariably wastes time reviewing information he has already seen.

It would therefore be advantageous to provide a mechanism that allowed a user to review RSS content without having to link to the page which provides such content.

SUMMARY OF THE INVENTION

The invention provides two enhancements for the use of favorites during a Web browsing session. A first enhancement identifies when a user is adding a favorite to his favorites list and auto-suggests a folder under which the favorite could be stored. A second enhancement allows a user to review his favorites list and see a summary of feed content (RSS or other format) automatically displayed in-line with each feed enabled web site in his favorites list, without requiring him to explicitly to link to the feed URL in question.

DETAILED DESCRIPTION OF THE INVENTION

The invention provides two enhancements for the use of favorites during a Web browsing session. A first enhancement identifies when a user is adding a favorite to his favorites list and auto-suggests a folder under which the favorite could be stored. A second enhancement allows a user to review his favorites list and see a summary of feed content (RSS or other format) automatically displayed in-line with each feed enabled web site in his favorites list, without requiring him to explicitly to link to the feed URL in question.

In the presently preferred embodiment, when a user is engaged in a Web browsing session with a browser such as Safari or Firefox, the user may bookmark a Web page of interest for later retrieval and review. The bookmark, also referred to as a favorite, is sent to a host for storage and also sent to a metadata server. The metadata server performs a lookup of the URL and/or other information associated with the bookmarked page for category information and/or for RSS information. The browser, i.e. the user client, can also retrieve relevant information from the Web page. The metadata server makes associations and returns these to the user.

In the case of an RSS feed associated with a bookmarked page, the application (web browser or web application) shows an icon relative to the bookmark. Clicking on the icon retrieves the most recent "headlines" for the feed. The client application periodically checks for new headlines. When the user selects a list of bookmarks, each bookmark in the list that has an associated RSS feed, displays the headlines corresponding to the most recent headlines for the in-line with the bookmark list. In the presently preferred embodiment, the five most recent headlines are shown for each RSS enabled Web page in the list. The actual number of headlines, amount of text presented, and update frequency may be set to default values or they may be set by the user in a preference pane. Additionally, a refresh button may be provided.

In the case of automatically organizing bookmarks as they are acquired, The URL and/or other relevant information of a page being bookmarked is referenced by the metadata server to a hierarchical classification scheme, such as that of the Open Directory Project (http://www.dmoz.org). A folder suggestion is returned to the user that identifies a most likely folder for saving the bookmark. The user may select the suggested folder, or he may save the bookmark in any other folder, or create a new folder.

The following discussion details a presently preferred implementation of the invention.

Feed Integration

Functions. When a new favorite is added, part of the process in the background is finding an associated feed (RSS/Atom or other format). If a feed can be found (with associated headlines), a feeds icon, shown in FIG. 1 as "RSS", is displayed to the right of the favorite. Additionally, another tree control appears next to the favorite icon. Finally, an additional feature is to display a feeds/new feeds differentiation integrated in the folder icon, in case all folders are closed when new feeds are fetched. This applies to all parent folders of URLs with feeds. The new feed status shows if there are one or more new feeds contained anywhere in the folder or enclosed folders.

Figure 1:
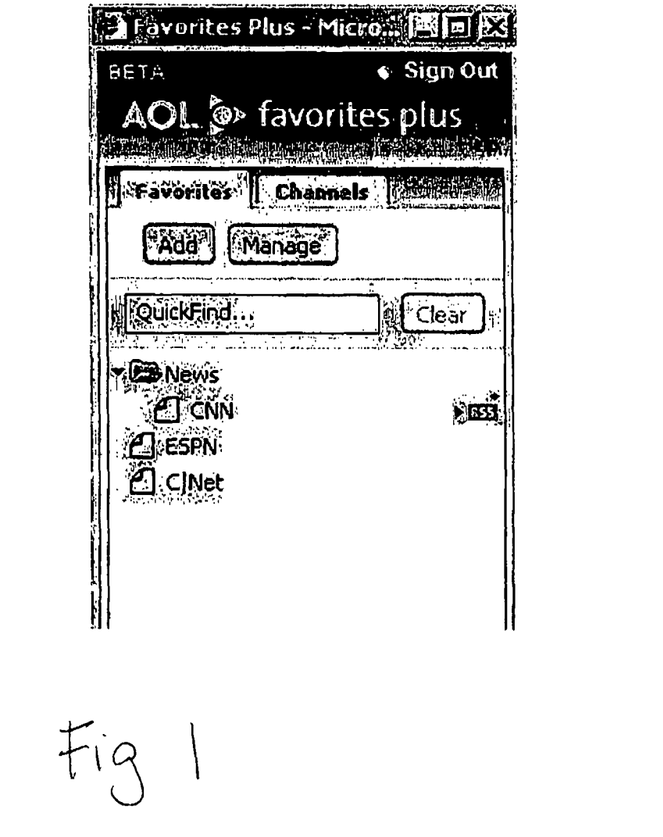
FIG. 1 is a screen shot showing RSS integration in a collapsed view according to the invention.

Interaction. Clicking on the title of the favorite takes the user to the favorite place. However, clicking on the "RSS" icon on the right, or expanding the new tree control accesses additional features.

Figure 2:
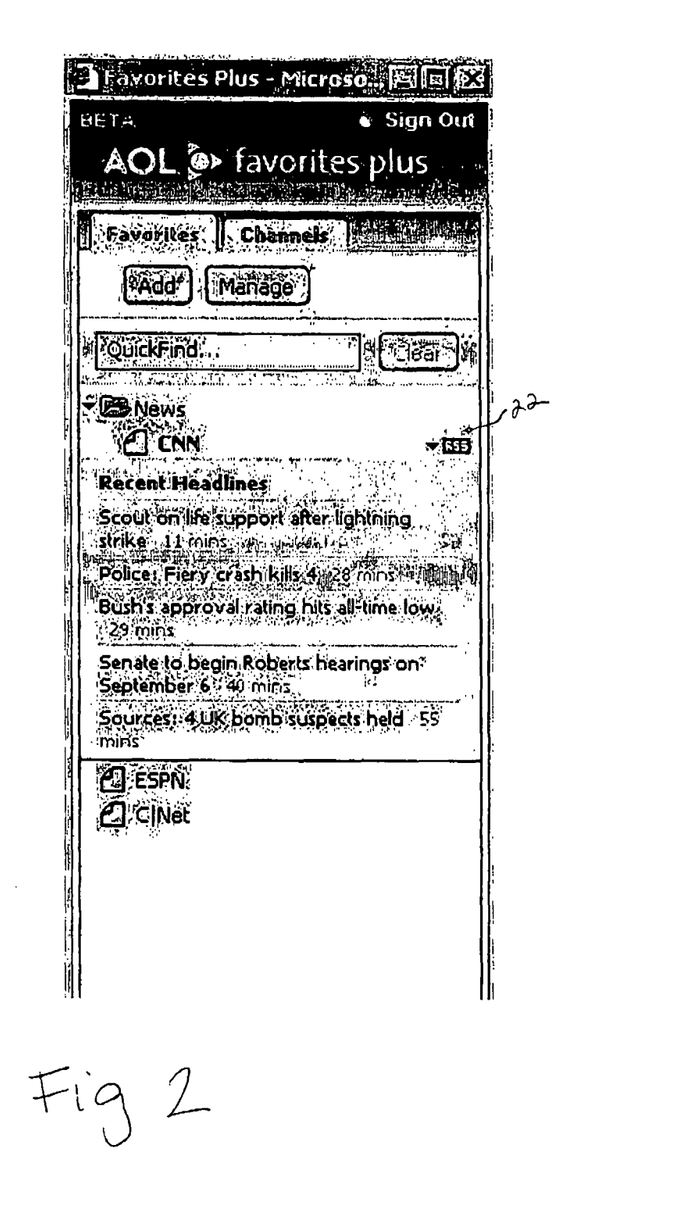
FIG. 2 is a screen shot showing RSS integration in an expanded view according to the invention.

FIG. 2 shows RSS integration in an expanded view according to the invention. Once the tree control for the favorite is expanded, it displays the top five headlines, ordered by descending date, of the associated feed. Because screen space is at a premium, the preferred embodiment only displays the first few characters of the headline, and truncates it after that. Clicking on any of the headlines takes the browser to the link associated in the feed. Note that an icon 22, i.e. a "sun", indicates that new articles are present.

Those skilled in the art will appreciate that any number of headlines may be displayed and that such headlines may be displayed in any order. Additionally, a user preference dialog may be provided to allow the user to select such parameters as number of headlines displayed, order of display, and number of characters to display, for example.

Figure 3:
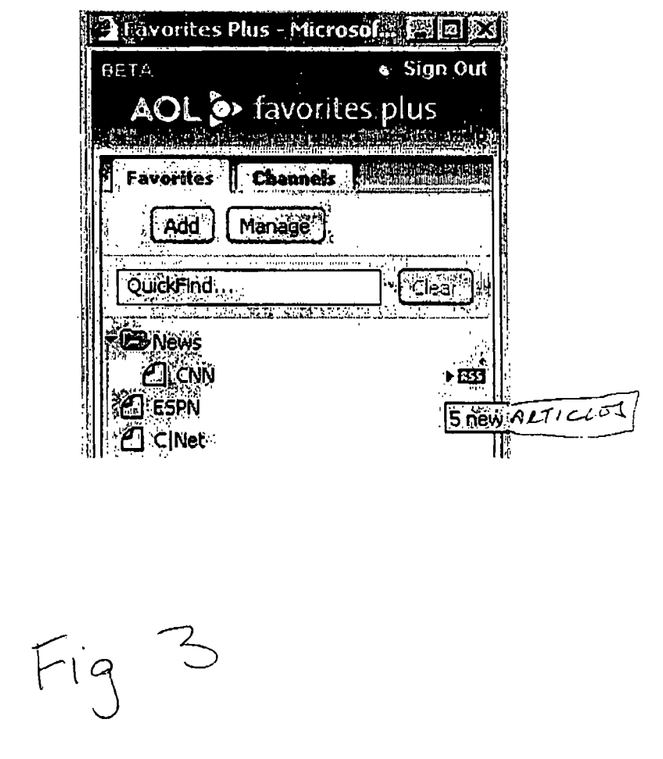
FIG. 3 is a screen shot showing an RSS hover state according to the invention.

FIG. 3 is a screen shot showing an RSS hover state according to the invention. To give the user some notification that a feed has been updated, the icon showing that a favorite has a feed preferably has two states. The default state and an updated state, which is shown if a feed has, been updated in the last hour in this example. Note that for accessibility reasons, contrast should be more important than color as a change indicator for this icon. Hovering over the new feeds icon shows the number of new feeds. No hover state is provided for normal state "RSS" icon, i.e. there are no new feeds.

Add Favorite

Figure 4:
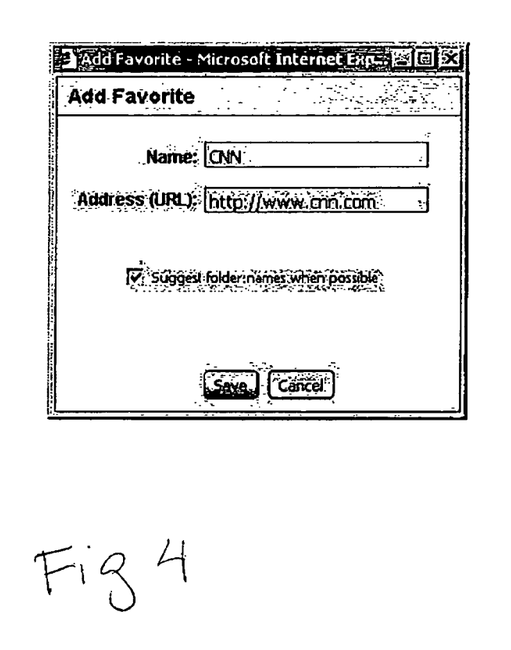
FIG. 4 shows an add favorite form according to the invention.

Add Favorite Window. FIG. 4 shows an Add Favorite form according to the invention. When the user clicks the "Add" button, or selects "Add Favorite . . . " from the favorites menu, the Add Favorite flow begins.

Add Favorite form Functions. The user first selects one of the radio button options. "Select a Folder" is the default option. If the user has the "Suggest folder names" feature turned on, there is an initial delay with progress feedback while the browser retrieves that information. During this time, the folder pull-down menu is disabled, and an animated loading label is displayed. Also, note that the save button is disabled during this interaction. In the case that the user has turned off the folder suggestion, all of this goes away, and a folder pull-down menu is provided. If this option is turned off, such state is stored in the user preferences. Completion of the Add Favorite flow results in the display of an updated panel showing the favorite at the bottom of either the root of the list, or the bottom of the items inside a folder if a folder was selected prior to adding.

Folder Suggestion

Figure 5:
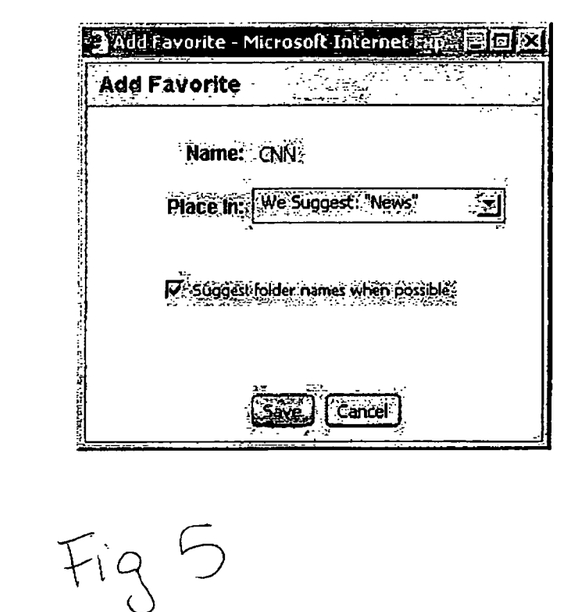
FIG. 5 is a screen shot showing folder suggestions according to the invention.

Folder Suggestion. FIG. 5 is a screen shot showing folder suggestions according to the invention. In the event that a suggested folder is found for the new favorite, the pull-down defaults to that folder. FIG. 5 shows the folder with the name boldfaced, and a special icon to denote that it is a suggested folder.

Figure 6:
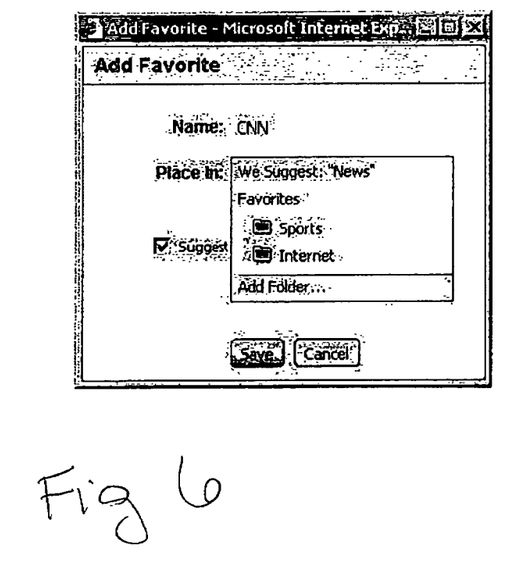
FIG. 6 is a screen shot showing a folder pull-down menu according to the invention.

Folder Pull-down Menu. FIG. 6 is a screen shot showing a folder pull-down menu according to the invention. The folder's pull-down menu is straight forward. Preferably, the menu shows folder icons, and uses indention to represent hierarchy.

Architecture

Figure 7:
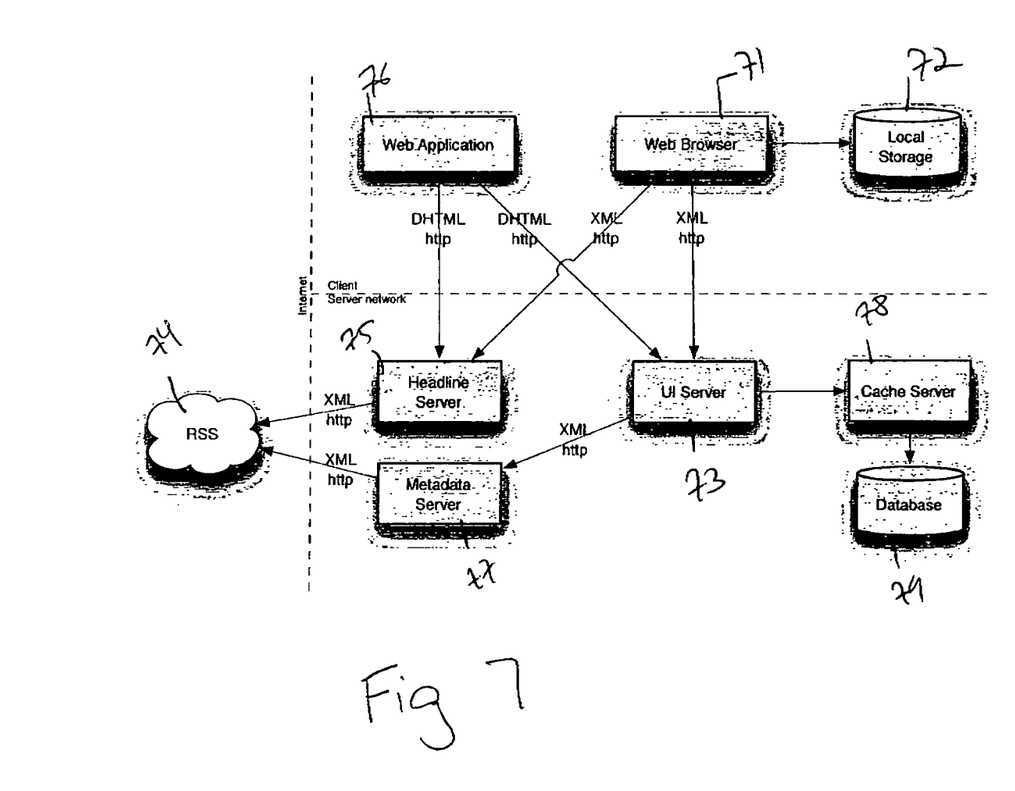
FIG. 7 is a block schematic diagram showing a preferred enhanced favorites system architecture.

FIG. 7 is a block schematic diagram showing a preferred enhanced favorites system architecture. The following is a discussion of each of the items shown in FIG. 7.

Web Browser: The web browser 71 stores the users' favorites, locally via a local storage service 72 and updates them as needed from the host.

Some information about the network connections:
a. The web browser gets and sets favorites information by issuing XML over HTTP commands to the UI server 73. On startup, the web browser issues a get request with the current version it has. If the version cached in the local store is older, the full set of favorites is downloaded from the UI server.
b. When a user adds a URL to his list of favorites, the web browser issues a request to the UI server to retrieve the associated feed URL and suggested folder name. When the user chooses a folder, the web browser then sends the URL, feed URL, title, and folder name to the host (server) for permanent storage.
c. When displaying favorites to the user, the web browser may fetch RSS feed 74 associated with favorites via the Headline server 75, taking advantage of the caching the latter performs.

2. Web Application: The Web application 76, is the UI vehicle for "enhanced favorites" outside of the web browser when the user uses any other web browser. It connects to the UI server via HTTP, and receives from it DHTML content. It receives RSS feed content when requested from the Headline server.

3. UI Server: The UI server is both a data aggregator and a presentation layer for clients.

Some information about the UI Server network connections:
a. Serves up UI and favorites metadata as DHTML to Web browsers. Receives requests from browsers to retrieve as well as to make changes to favorites using HTTP.
b. Serves up Favorite data and performs add/delete/modify operations for web browsers using XML over HTTP.
c. Serves up metadata to web browsers using XML over HTTP. To get the folder suggestion and feeds for favorites submitted it issues requests to the metadata server 77. This server analyzes the favorite URL and matches it with its internal database to come up with associated feeds and a taxonomy path. It then uses mapping rules to transform the taxonomy path into a folder suggestion. It then returns the feeds and suggested folders, which is what the client is interested in.
d. For authentication, the preferred UI server relies on the AOL standard authentication infrastructure.

4. Headline Server: The headline server serves RSS feed content (headlines and article summaries) to Web browsers or AOL Explorer clients upon request via HTTP. It isolates the web browsers from different RSS protocols by normalizing feeds to one particular RSS format. Additionally, the server provides two interfaces, XML and DHTML, which allow simple access to feeds and headlines from almost any development platform. The headline server also allows for improved client performance by caching popular feeds and headlines and by using an HTTP connection pool to retrieve feeds from their source.

5. Enhanced Favorites Cache Complex: This element 78 caches user's favorites to reduce the load on the databases and offer a better experience for web users. The system handles requests from the UI server to add/delete/modify users' data and stores it in the DB 79 for persistence.

6. URL Metadata Server: This service can accept a request containing a URL or a set of URLs and return data about that URL or set of URLs. The kinds of data that can be returned include folder suggestions and associated feeds. Incoming query requests come from the UI server in the form of XML over HTTP.
7. Database: The database stores the users' favorites and associated information. The data is accessed by the Cache Complex.
8. RSS: This represents HTTP servers that can provide RSS and Atom feeds. These feeds might be offered by a service such as AOL or by other feed providers.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method of saving links to web pages, the method comprising the following operations performed by at least one processor:
   while a client machine is presenting a web page to a user, responding to a user request to store a link to the presented web page in a user-traversable favorites hierarchy by:
      consulting at least one machine-readable database to obtain a taxonomy path for the presented web site;
      using mapping rules to transform the taxonomy path into a storage suggestion including a suggested folder name or a suggested location in the favorites hierarchy or both; and
      one of presenting the storage suggestion to the user or automatically storing the link in the favorites hierarchy utilizing the suggested folder name or suggested location or both.

2. The method of claim 1, wherein the at least one processor exists on the client machine, the steps are performed by a web browser on the client machine, and the hierarchy is stored on the client machine.

3. The method of claim 1, wherein the at least one processor exists at an online search provider and the hierarchy is stored at the online search provider.

4. A system for saving links to web pages, comprising:
   at least one memory device storing a set of instructions; and
   at least one processor that executes the set of instructions and is configured to respond to a user request to store a link to a web page presented at a client machine in a user-traversable favorites hierarchy by performing the steps of:
      consulting at least one machine-readable database to obtain a taxonomy path for the web page;
      using mapping rules to transform the taxonomy path into a storage suggestion including a suggested folder name or a suggested location in the favorites hierarchy or both; and
      one of presenting the storage suggestion to the user or automatically storing the link in the favorites hierarchy utilizing the suggested folder name or suggested location or both.

5. The system of claim 4, wherein the at least one processor exists on the client machine, the steps are performed by a web browser on the client machine, and the hierarchy is stored on the client machine.

6. The system of claim 4, wherein the at least one processor exists at an online search provider and the hierarchy is stored at the online search provider.

7. A non-transitory computer readable medium storing instructions that, when executed by at least one processor, configures the at least one processor to perform a method for responding to a user request to store a link to a web page presented at a client machine in a user-traversable favorites hierarchy, the method comprising:
   consulting at least one machine-readable database to obtain a taxonomy path for the web page;
   using mapping rules to transform the taxonomy path into a storage
   suggestion including a suggested folder name or a suggested location in the favorites hierarchy or both; and
   one of presenting the storage suggestion to the user or automatically storing the link in the favorites hierarchy utilizing the suggested folder name or suggested location or both.

* * * * *